UNITED STATES PATENT OFFICE

FRANKLIN KERSTING, OF GRAND RAPIDS, MICHIGAN, ASSIGNOR OF TWO-THIRDS HIS RIGHT TO CARL RUDOW AND BENJ. F. BROADWELL, OF SAME PLACE.

IMPROVEMENT IN REFINING VARNISHES.

Specification forming part of Letters Patent No. 144,910, dated November 25, 1873; application filed October 12, 1872.

*To all whom it may concern:*

Be it known that I, FRANKLIN KERSTING, of Grand Rapids, in the county of Kent and State of Michigan, have invented a new and useful Method of Clarifying Varnishes and other Liquids, of which the following is a specification:

My invention relates to clarifying varnishes, oils, turpentine, molasses, and all liquids requiring clarification; and the invention which forms the subject-matter of this patent consists of a new mode of clarifying and improving the luster of varnishes and oils, and in the means for carrying out that mode, which consists in the employment and combination of pulverized or ground burnt oyster-shells and fine marble-dust, or their equivalents, and in the production of a new and improved varnish, as an article of manufacture and trade, from manufactured varnish, as will be hereinafter more fully described.

Heretofore, in the manufacture of varnish, it has required from three or six to nine months to settle or precipitate the insoluble components of varnishes, while, by my method, this can be easily effected in forty-eight hours, or less, and the varnish freed from all motes and specks. Hitherto, also, quick-drying varnishes have been used, but have been more or less dirty and specked. By my method the drying quality of the varnish is greatly improved, and a brilliant and durable luster is added.

The object of my invention is to remedy the difficulties heretofore experienced in clarifying varnishes; and to this end I use as clarifiers ground burnt oyster-shells and pulverized marble-chips as a precipitant.

My method is as follows: I take oyster-shells, burn them well, and grind them to a fine powder; I then grind marble chips and dust to a powder, also. These are thoroughly mixed together and thrown into a vessel containing varnish; the mixture is then allowed to stand forty-eight hours, during which time all the dirt, motes, and gum specks of the varnish are precipitated to the bottom of the receptacle; and a new and improved varnish is thus produced for the trade from any kind of varnish in use.

The following proportions are usually observed by me in the clarification of manufactured varnishes: One-half pound burnt ground oyster-shells and the same quantity of pulverized marble-chips are mixed together and put into ten gallons of varnish of any kind.

The theory and practice of my method are, that all the dirt and impurities of the varnish are attracted by and adhere to the oyster-shell dust, and the weight of the marble dust mixed therewith precipitates every floating particle to the bottom of the receptacle; and it may be easily understood that when all impurities are taken from the varnish it must necessarily give a more lustrous surface to the article varnished, and, all gum specks and motes having been removed, no polishing is required, as the varnish itself thus clarified gives a perfectly smooth and lustrous surface.

My method is equally applicable to the clarification of turpentine, oils, and molasses. It also purifies alcohol, and it is valuable in clearing wines and spirituous liquors.

It will be seen from this description that the clarifying ingredients are obtained without cost, and that the process of preparing them for use is effected at a merely nominal expense.

The burnt powder may be from any kind of shell; but I prefer the oyster-shell, because it is abundant and very effective for the purpose, the burning thereof serving as a means to remove the alkalies and give the shell-dust its light attractive quality, which causes every impurity in the liquid to be attracted by and adhere to the flake-like floating particles, and its chemical action with the marble-dust produces a perfect action through the liquid, and in a short time settles, carrying every impurity to the bottom. The liquid is then poured or drawn off, leaving the sediment (which, by reason of its gummy nature, remains at the bottom) to be used over again.

This method not only clarifies and purifies, but tempers, the varnish treated, and beautifies its luster in proportion to its freedom from granulated matter.

Varnish thus treated can be worked to better advantage, and is more durable, forming a fine, strong body, adhesive and elastic, and will not crack or peel. It brings out the colors with more brilliancy and better effect, and produces a beautiful finish and gloss on whatever surface it may be used.

For leather it is especially applicable, by reason of its free electric character.

I have described my method as applicable to the clarification of all liquids; but this only embraces such liquids as can be properly thus treated. I have also described my method as being especially useful in clarifying refined manufactured varnish; but it is obvious that the method can be used direct in the manufacture of varnish with the same perfect results.

In carrying out my new method, a new article of manufacture and trade is produced thereby, being a perfectly-clarified article, which can be distinguished from any similar article in the market by its body and luster and perfect transparency, and especially so with varnishes and oils. The difference in these can also easily be determined by their use, as it flows more readily and freely from the brush, while its clearness gives a highly-polished surface to the article varnished. It can be distinguished from other varnishes, to a very great extent, in pouring it or drawing it, by reason of its running more freely, which will show its freedom from thickness and impurities, so that it needs no thinning for use. The difference between the new and the old article may be easily determined by an expert, by rubbing it in his hands and upon a smooth surface.

Having described my invention, I claim—

1. The method, substantially as described, of clarifying and improving the luster of varnishes, and clarifying all manufactured liquids.

2. In such method, the employment of burnt ground or powdered oyster-shells.

3. In such method, the combination of pulverized marble and ground burnt oyster-shells, or their equivalent.

4. As a new article of manufacture and trade, varnish rendered clear and of improved gloss and elasticity, as herein described.

In testimony whereof I have hereunto set my hand this 11th day of October, A. D. 1872.

FRANKLIN KERSTING.

Witnesses:
A. E. H. JOHNSON,
J. W. HAMILTON JOHNSON.